A. LIBERTY.
WATER LEVEL INDICATOR AND ALARM.
APPLICATION FILED OCT. 20, 1916.

1,318,213.

Patented Oct. 7, 1919.

Archie Liberty
Inventor

By Geo. P. Kimmel
Attorney

UNITED STATES PATENT OFFICE.

ARCHIE LIBERTY, OF AMASA, MICHIGAN.

WATER-LEVEL INDICATOR AND ALARM.

1,318,213.                    Specification of Letters Patent.        Patented Oct. 7, 1919.

Application filed October 20, 1916. Serial No. 126,309.

*To all whom it may concern:*

Be it known that I, ARCHIE LIBERTY, a citizen of the United States, and resident of Amasa, in the county of Iron and State of Michigan, have invented certain new and useful Improvements in Water-Level Indicators and Alarms, of which the following is a specification.

The present invention relates to new and useful improvements in automatic water level indicator and alarm devices and has particular reference to a novel type of alarm for association with a steam boiler or the like whereby to indicate a predetermined water level and when the water level reaches either an abnormally low or high point an alarm will be given such as the blowing of the steam whistle of the boiler or the like.

An object of my invention is to provide a water level indicating and alarm device of the character referred to which may be quickly and easily attached in any convenient position on any of the existing types of steam boilers without materially altering the structure of the boiler.

A further object of my invention is to provide a device of the character described which is simple in construction, strong and durable, cheap to manufacture and effective in operation.

Other objects and advantages to be derived from the use of my improved steam boiler water level indicator and alarm will appear from the following detailed description and the claim, taken with an inspection of the accompanying drawing, in which:

Figure 1:
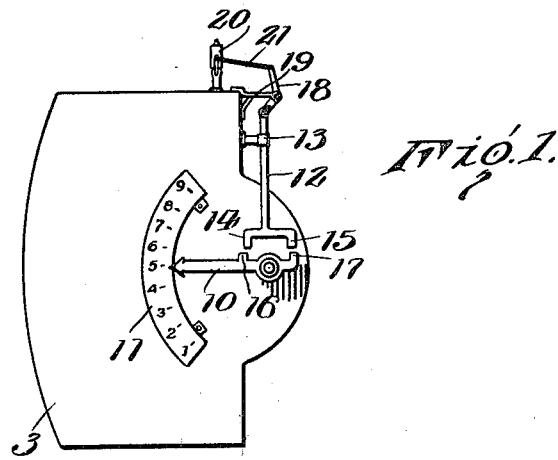
Figure 1 is a side elevational view of a water level indicator and alarm embodying the improvements of my invention.
Figure 2:
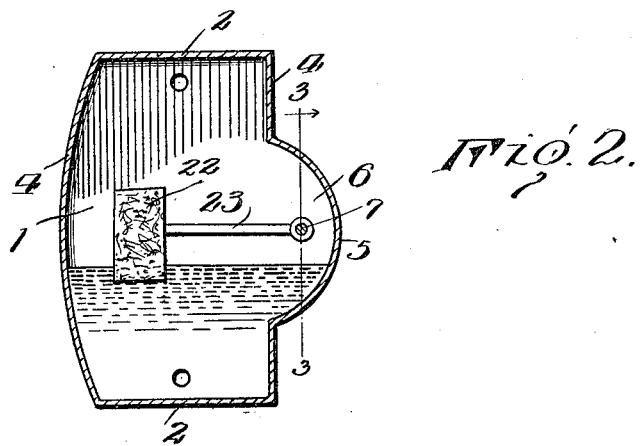
Fig. 2 is a vertical sectional view through the same.
Figure 3:
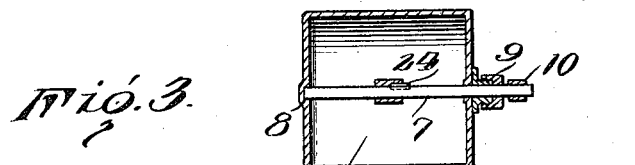
Fig. 3 is a similar view taken on the line 3—3 of Fig. 2 looking in the direction of the arrow.

Referring more particularly to the drawing, wherein similar characters of reference designate like and corresponding parts throughout the various views, 1 designates in its entirety the float chamber or housing of my invention, the same having top and bottom walls 2, side walls 3 and 4, one of the side walls 4 being curved outwardly as best shown in Fig. 2.

A semi-circular enlargement 5 is formed on the side wall opposite to the arcuate wall, to form a recess 6 in which is transversely arranged a shaft 7, said shaft having bearings at 8 and 9, said bearing 9 being formed to provide a water-tight joint. It will be apparent that one end of the shaft 7 projects beyond the side of the housing 1, said free end of said shaft having an indicating arm 10 carried thereby, the free end of said arm being movable across an arcuate dial 11. To render an alarm I provide a vertically movable rod 12 mounted in a guide bracket 13, said rod 12 having lateral extensions 14 and 15 on the lower free end thereof, said extension to be engaged, at times, by projections 16 and 17 carried by the indicator arm 10. A bell-crank lever 18 is pivotally mounted on a bracket 19 adjacent the upper end of the rod 12, said bell-crank lever being connected with the upper end of said rod and to be actuated thereby. A steam or air whistle 20 is connected by means of a link 21 to the upper free end of the bell-crank lever 18 so that upward movement of the rod 12 will cause a signal to be given by the whistle. Of course, the connection between the bell-crank lever and the rod 12 is a sliding connection as is obviously necessary.

The arm 10 is actuated by means of a float 22 rigidly carried by the free end of a rod 23, said rod being keyed to the shaft 7 as at 24.

In use the float chamber of my invention is placed on a boiler in communication with the interior of the same so that the water level in the boiler will be identical with that in the chamber 1. As the water level rises or falls in the boiler, the water level in the chamber 1 will do likewise causing the float 22 to rise or fall imparting a partial rotation to the shaft 7. This will move the arm 10 across the dial 11 indicating the fluctuation in water level. With a normal quantity of water in the boiler, the lugs 16 and 17 are retained in spaced relation to the extensions 14 and 15 affording a limited amount of free movement of the hand 10 over the dial 11 entirely independent of contact with the rod 12, but should the water level become abnormally high or low, one or the other of the lugs 16 or 17 will engage the extensions 14 or 15 carried by the rod 12 causing said rod to rise and operate the whistle. Thus it will be seen that I have provided a compact and effective indicator and alarm for use in connection with boilers, tanks and the like for indicating water level which may be attached to any of the existing types of steam boilers or the like without materially altering the structure of the same.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

A device of the character described including a housing, a shaft supported in said housing, a float carrying arm connected with the shaft and arranged internally of the housing, an indicator hand supported upon the shaft externally of the housing, a dial associated with said hand, lugs formed upon said hand on opposite sides of the shaft, a vertically movable rod having a bifurcated extremity arranged for engagement with the lugs of the hand during oscillating movement of the latter, the bifurcations of the rod being normally disposed in spaced relation to the lugs of the hand permitting a limited swinging movement of the latter independent of contact with the rod, and an audible signal operable by the rod.

In testimony whereof, I affix my signature hereto.

ARCHIE LIBERTY.

Copies of this patent may be obtained for five cents each, by addressing the "Commissioner of Patents, Washington, D. C."